United States Patent [19]

Illy

[11] Patent Number: 4,484,515
[45] Date of Patent: Nov. 27, 1984

[54] AUTOMATIC ESPRESSO COFFEE MACHINE

[76] Inventor: Ernesto Illy, 8, Via Locchi, Trieste, Italy

[21] Appl. No.: 491,065

[22] Filed: May 3, 1983

[30] Foreign Application Priority Data

May 4, 1982 [IT] Italy ................................ 21054 A/82

[51] Int. Cl.³ ............................................. A47J 31/24
[52] U.S. Cl. ....................................... 99/282; 99/283; 99/285; 99/289 T; 99/299; 222/54
[58] Field of Search ................. 99/280, 281, 282, 283, 99/285, 289 R, 289 T, 289 D, 289 P, 291, 295, 299, 302 R, 302 P; 222/52, 54, 55

[56] References Cited

U.S. PATENT DOCUMENTS 3,371,592 3/1968 Remy ..................................... 99/282
3,804,297 4/1974 Jurjans .................................. 222/54
4,330,702 5/1982 Cheng ................................... 99/281
4,353,293 10/1982 Illy .......................................... 99/283

Primary Examiner—Robert W. Jenkins
Attorney, Agent, or Firm—Peter K. Kontler

[57] ABSTRACT

The automatic espresso coffee machine brews coffee from coffee pods placed in an extraction head or in a plurality of extraction heads and is characterized in that it comprises an electronic control system, including a microprocessor and memory means, which operate all the operations of the machine. In particular, the machine carries out a continuous control of the water temperature in a boiler in order to keep that temperature in a narrow range of a selected temperature. It also controls the volume of the hot water delivered to each extraction head to be within a narrow range of predetermined volume. The machine diagnoses itself for possible failures and depleted supplies by showing on a display in code the kind of failure or of needed supply, i.e. coffee.

11 Claims, 10 Drawing Figures

AUTOMATIC ESPRESSO COFFEE MACHINE

BACKGROUND OF THE INVENTION

The present invention relates to an automatic espresso coffee machine.

There are known automatic machines that are able to brew coffee from measures of ground or pulverized coffee or from coffee pods distributed along a water permeable paper tape. The water temperature control for such machines is deficient and the temperature of the hot water arriving in the extraction chamber varies widely, sometimes by 20° C. The latter detracts from the goal of brewing consistent espresso coffee of good quality. Moreover, the known machines are subject to accidents during operation and to failures which involve stoppage of the machine and require a knowledgeable operator to detect the failure and to carry out repairs.

OBJECTS AND SUMMARY OF THE INVENTION

An object of the present invention, therefore, is to provide an automatic machine which brews espresso coffee from coffee pods in one or more extraction heads of known type and comprises electronic control means that carry out the control of all the functions. In particular, the machine controls the water temperature to be within a range of ±2° C. about a predetermined reference value. It also controls the volume of water delivered to the extraction chambers. The machine diagnoses itself for possible failures and depleted supplies (e.g. coffee, water) in the machine.

The machine preferably comprises two extraction chambers in two extraction units in order to simultaneously supply two cups of coffee. An electronic control system, based on a microprocessor SC/MP, has a push-button panel for operating the machine and a display for showing signals to the users.

The microprocessor is associated with an electronic temperature sensor, adapted to sense temperature differences of 0.1° C. Signals transmitted from the sensor are used to control an electric resistance heater for the water. Such signals not only depend on the temperature of the water in the boiler but also depend on the general temperature conditions in the machine. Thus, the temperature control has several functions. Depending on the sensed temperature and on the conditions of the thermal efficiency of the combination electric resistance-boiler, this control system is also able to show to a user the possible presence of limestone around the electric resistance.

A flowmeter supplies data to the microprocessor through an operational amplifier working as a level detector. The flowmeter generates a number ot electrical impulses proportional to the volume of water that flows through the flowmeter. A memory in the microprocessor contains an operating program that counts the supplied impulses and operates valves and a pump in accordance with the received signals. Once the correct volume is determined, an infusion is made by the hot water in a coffee pod.

The microprocessor is so programed that once a certain operation is started, it controls each step of a brewing operation until completion and proceeds from one step to the next only upon confirmation of proper execution of the earlier step. If the result of any control during a step is negative, then the microprocessor does not proceed to the subsequent steps or operations. Instead, it deactivates all the operative means of the machine and generates a signal for the display in the machine panel in the form of a digital code corresponding to the failure or depletion in the machine.

One advantage of the inventive machine is that the temperature of the water delivered to the extraction heads is made independent from the intermittent working of the machine. The temperature of the brewing water is held substantially constant. The volumes of the beverages delivered to the cup are controlled to be ±2 cu.cm with respect to the predetermined volumes. At least two coffee cups may be supplied simultaneously, each one from its own extraction chamber. The extraction units are completely independent one from another in case a machine is equipped with more extraction units. Common kinds of failure (example: electrical resistance not working) or depletion (example: pods used up) are indicated on the display of the machine so that the user may decide if he is in a position to repair the machine or he must call for assistance. So a user is saved from diagnosing the reason for a failure since the latter will appear in the display as a coded digital number.

BRIEF DESCRIPTION OF THE DRAWING

In order to better understand the invention an embodiment thereof will be described, as an example only, with reference to the attached drawings in which.

DESCRIPTION OF THE PREFERRED EMBODIMENT

Figure 1:
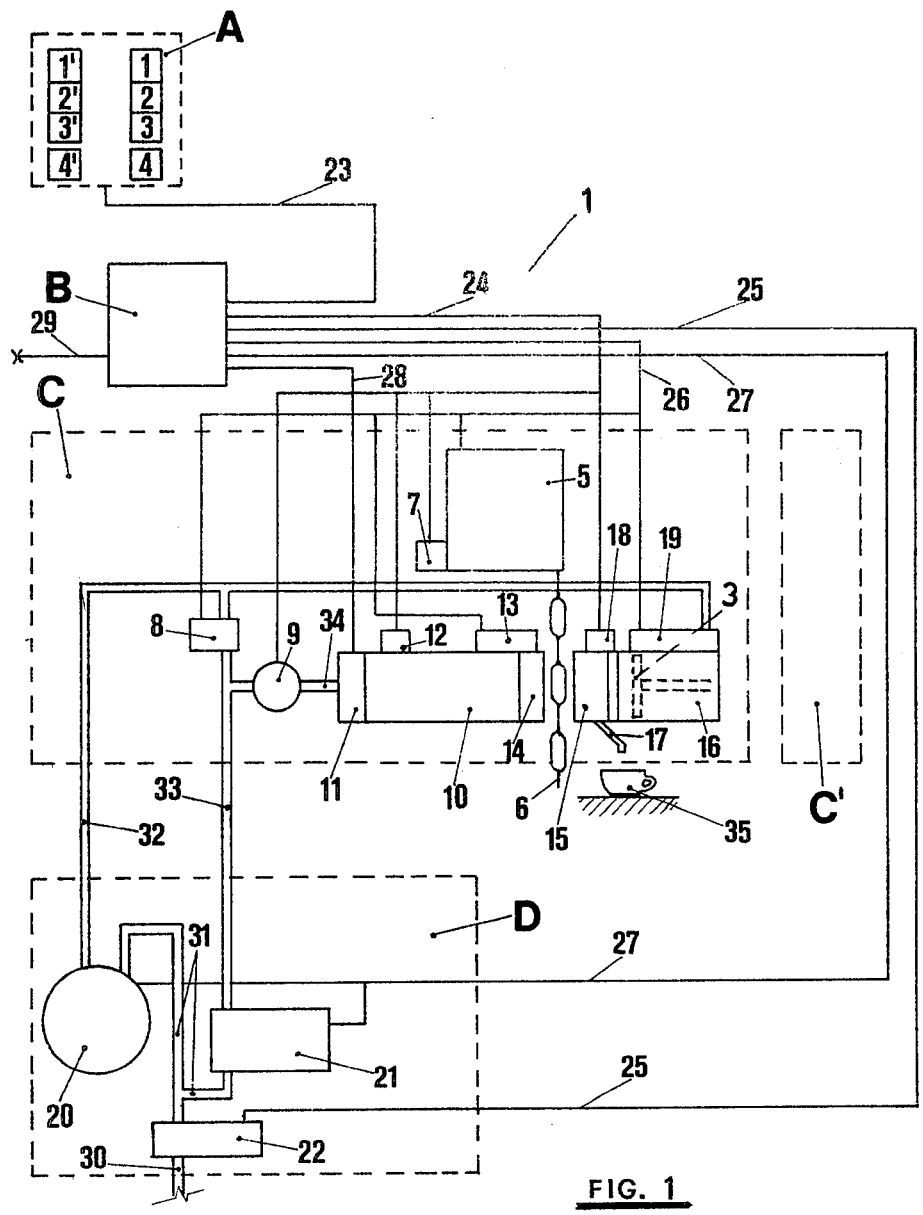
FIG. 1 is a schematic diagram of a machine equipped with two extraction units.

With reference to FIG. 1, the machine generally designated 1 includes a display and control module A electronically connected to a management module B. One or more extraction modules C,C' are provided to brew coffee under the direction of management module B. A pump module D supplies water and operating hydraulic pressure to the extraction module C,C'. the display and control module A comprises two sets of push-buttons 1,1'- 2,2'- 3,3' and two seven segments displays 4,4'. Buttons 1,1' serve to operate the brewing of an espresso coffee of standard volume hereinafter referred to as "normal coffee" respectively from the first and second extraction units C,C'; the buttons 2,2' serve to operate the brewing of an espresso coffee of more volume hereinafter referred to as "long coffee" respectively from the first and the second extraction units C,C'; the buttons 3,3' serve to stop the working, respectively, of the first and second extraction units C,C' and of all other operative parts in the machine if one wants a coffee of a volume smaller than that programmed; the two displays 4,4' are adapted to show a set of coded digitals for showing failures and depletions in the machine, respectively, in the first and second extraction units C,C' and also in the parts of the machine which are common with the two above units.

Figure 5:
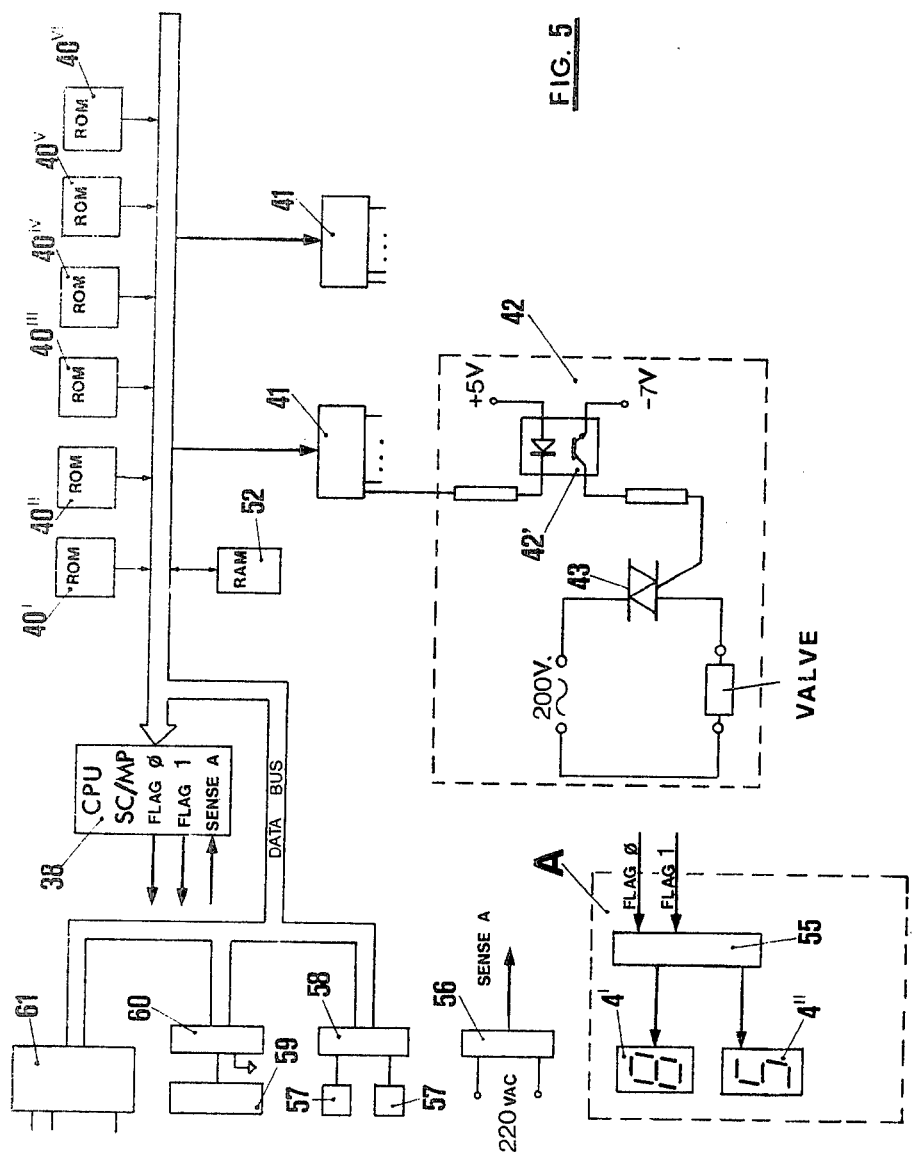
FIG. 5 is a general diagram of the microprocessor control including more detailed schematics of modules A and B.
Figure 6:
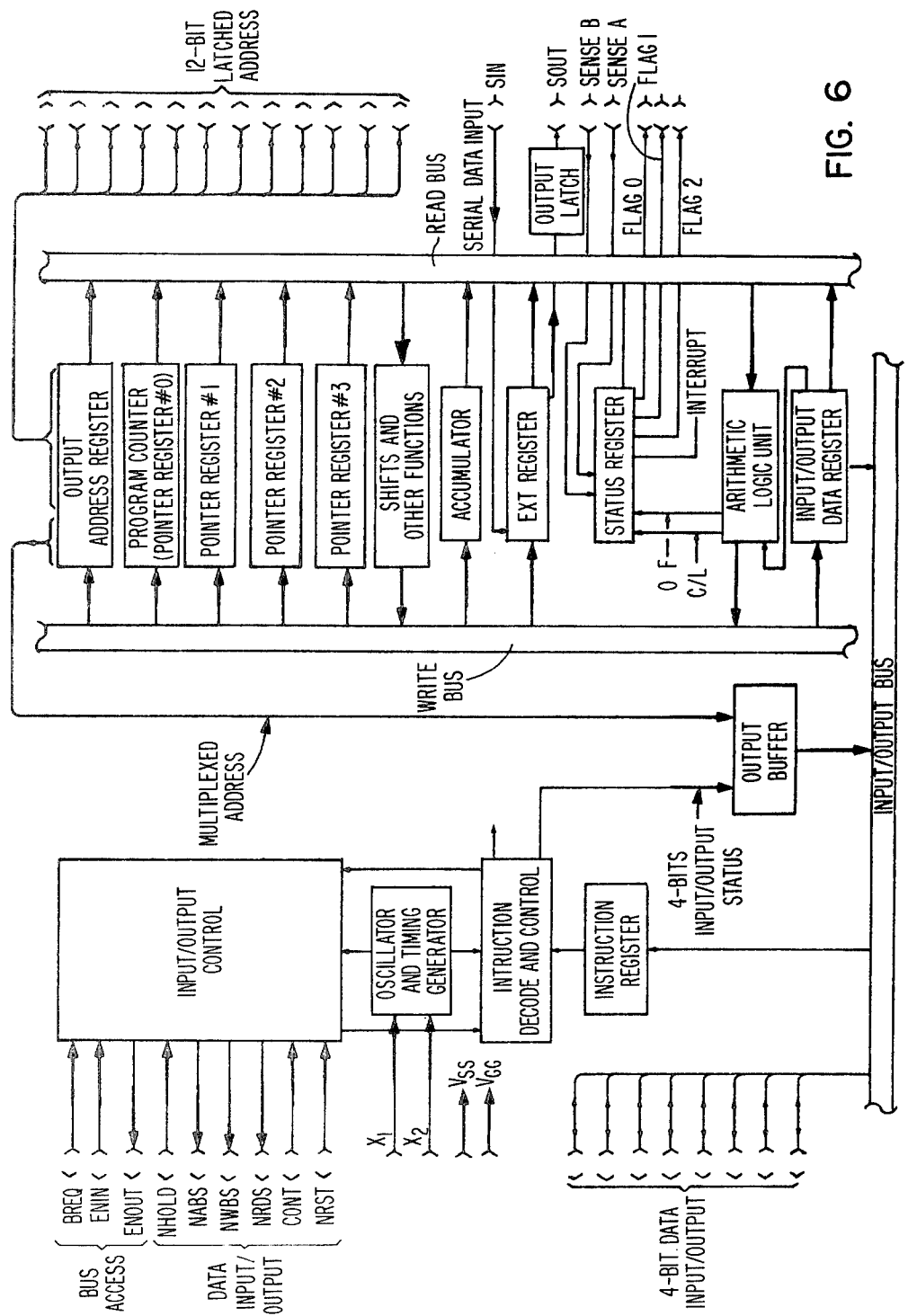
FIG. 6 is a diagram showing the inner architecture of the microprocessor.

B is a programming and electronic management module which comprises: a microprocessor SC/MP; memories MM 5204 of National Semiconductor (NS) wherein the operational program is stored; memories MM 2112 (NS) wherein the data required for carrying out the operational program are stored; a digital-analog convertor MM 5357 (NS); two flip-flops DM 8334 (NS) for keeping the commands; an optic buffer low-high tension MCA 230 Monsanto; a TRIAC RCA 2800 (M); an operational amplifier for clipping the signal delivered by the flowmeter 9 (see also FIGS. 5 and 6).

The two extraction modules C and C' are identical coffee feeding and brewing modules. Each is a self-maintained extraction unit. Module C' is shown in block to simplify FIG. 1. Module C includes a motor 5 for moving the pod bearing tape 6. A sensor 7 senses the position of the tape 6. An electrically controlled valve 8 controls the water inlet in a boiler 10. Flowmeter 9 measures the volume of water delivered to the extraction head 14, 15. Boiler 10 heats water using an electric resistance 11. Sensor 12 measures the temperature of the water in the boiler 10.

Three-way valve 13 controls the water outlet from the boiler to the extraction head 14, 15. The latter includes a stationary extraction head 14, a mobile extraction head 15 and an hydraulic cylinder 16 for operating the mobile extraction head 15. Sensor 8 detects the position of module head 15. A three-way electrically controlled hydraulic valve 19 controls the reciprocal movement of piston 3 in cylinder 16. Duct 17 delivers brewed coffee to a cup 35.

The module C' comprises the same means as listed in connection with module C and is connected with module B and D as described here below so that the two extraction modules C,C' work independently or simultaneously.

The pump module D includes a rotary pump 20, a reciprocating pump 21 and an electrically operated valve 22 for controlling the water inlet in the machine from a source of water. A rotary and a reciprocating pump of module D are in accordance with an invention of the applicant, which invention was the object of U.S. patent application Ser. No. 261,681, now U.S. Pat. No. 4,353,293. Rotary pump 20 is a "Procon" of Standex International GmbH from Krefeld (Federal Republic Germany) and reciprocating pump 21 is a "Turmix" of Turmix A.G. from Rapperswill-Jona (Switzerland). Unlike the referenced patent application, in the example illustrated here below, the reciprocating pump 21, in case a long coffee is requested, works simultaneously with the rotary pump 20. The pumps 20, 21 of the module D serve the extraction unit in the module C as well as for the extraction unit in the module C'.

FIG. 1 also shows the electrical conductor that interconnects module A-D to the sensors and electrically operated components. Thus, conductor 23 connects module A with module B and conductor 24 connects module B with position sensor 18 of module C,C'. Conductor 25 connects module B with the inlet electro-valve 22 of pump module D. Conductor 26 connects module B with the electrically controlled valves 8 and 19. Conductor 27 connects module B with the pump motors 20 and 21. Conductor 28 connects module B with the electric resistance 11. A supply cord 29 connects module B to a source of electrical energy.

Water line 30 connects the hydraulic system in the machine 1 with a source of water. Line 31 delivers water to pumps 20 and 21. Pump discharge line 32 for the pump 20 is connected to valve 19. Discharge line 33 of the pump 21 is connected to valves 8 and 9. Line 34 extends from flowmeter 9 to the boiler 10.

Figure 7:
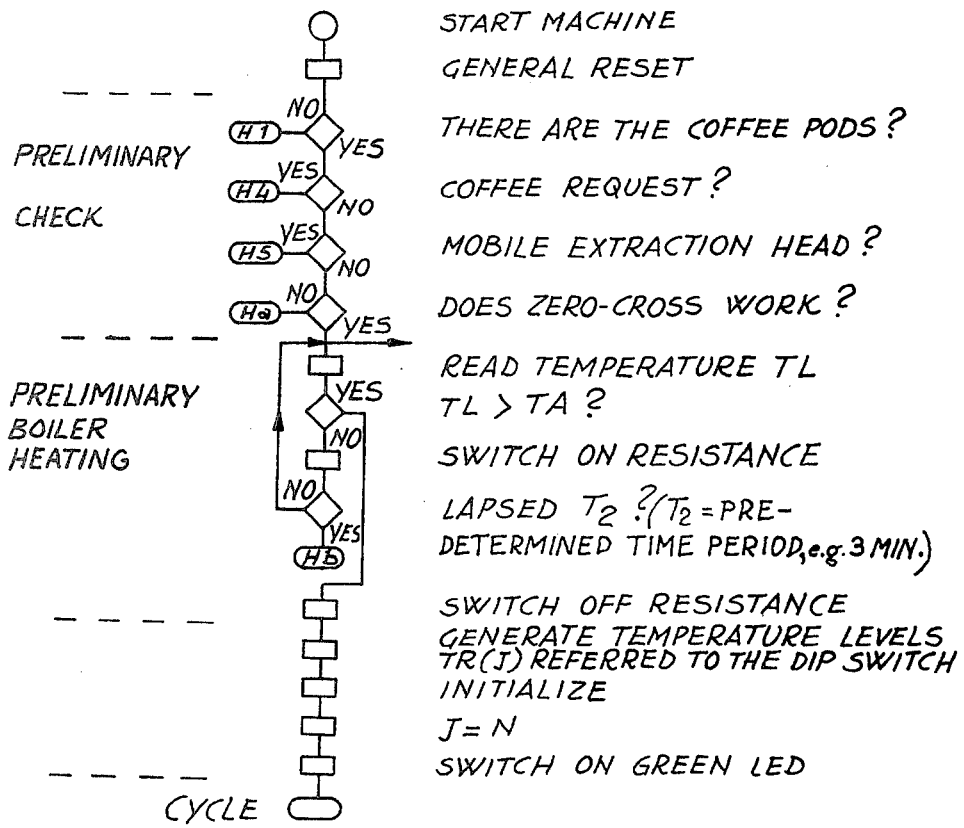
FIG. 7 is a flow diagram of an initialization program.
Figure 8:
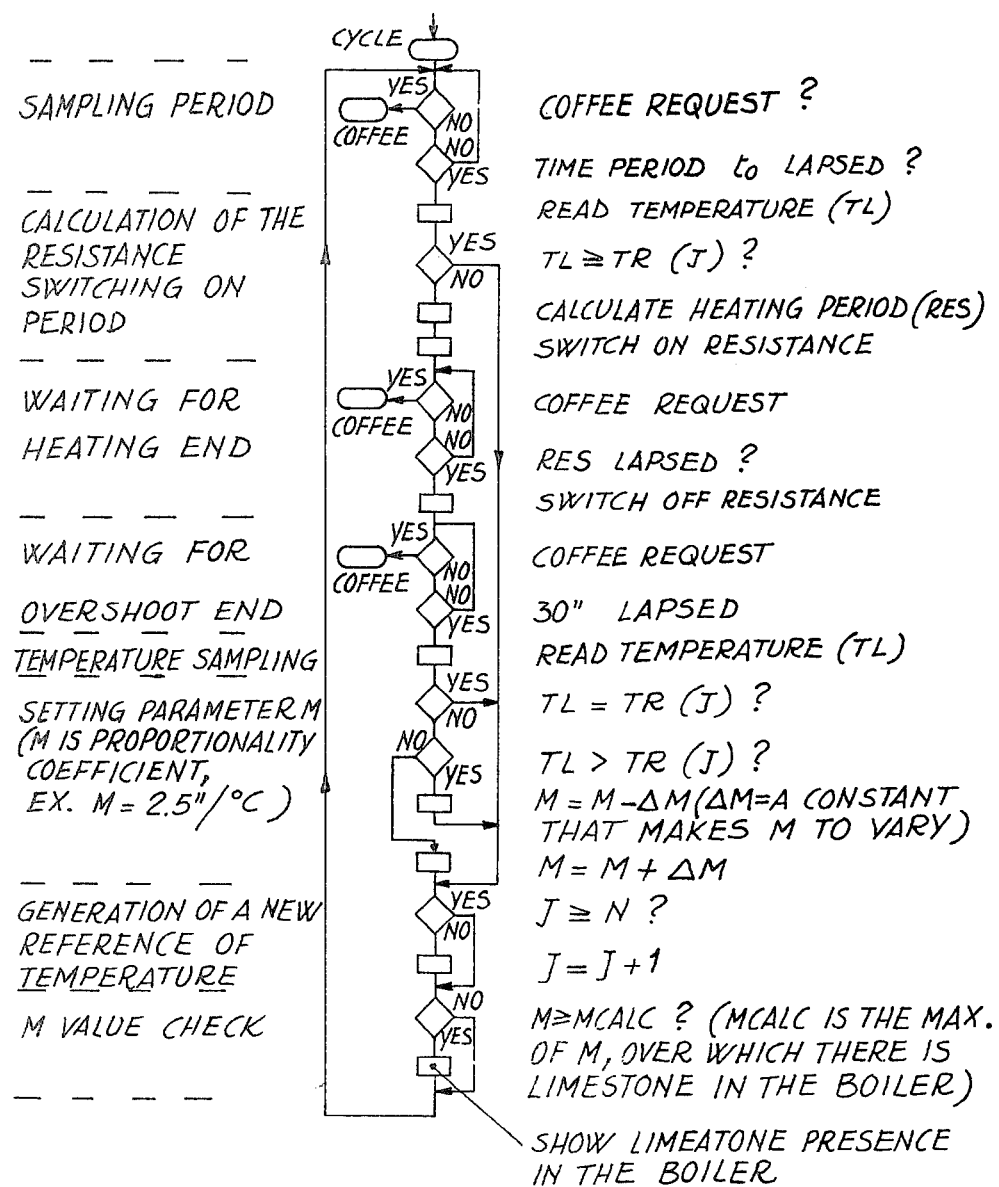
FIG. 8 is a flow diagram of an idle program.

The operation of the machine in accordance with the flow diagram of FIGS. 7, 8 is described as follows. The machine 1 is ready for operation once the cord 29 is connected to a source of electrical energy, the water line 30 is connected with a source of water and the machine is equipped with a tape 6. Then the machine 1, without being operated by an operator, automatically carries out a general checking of its own status and of the working of all its means. This is the INITIALIZATION routine shown in FIG. 7. If the result is satisfactory, module B energizes the resistance 11 until the water in the boiler 10 reaches the predetermined temperature as sensed by sensor 12. Until coffee is required, the machine 1 maintains a predetermined value of temperature in the boiler 10 through the combination electrical resistance 11, sensor 12 and module B. The status of the machine is shown by a conventional signal in the green LED in the displays 4,4' in control module A. All other operative means in the machine are dormant and the mobile extraction heads 15 are spaced from the stationary extraction heads 14. The machine remains in this IDLE mode (FIG. 8) until coffee is requested.

When a user requests a coffee by pushing, for instance, the button 2, the machine 1 performs the following processing procedure: module B checks the correct position of the tape 6 by reading the output of the sensor 7. If tape 6 is in position, module B switches off green LED in 4 and opens valve 22. Module B also activates motor 5 to advance the tape 6 so as to position a fresh pod in a seat in the stationary extraction chamber 14. When sensor 7 determines the fresh pod is in position, module B stops motor 5. Thereupon, module B activates pump 20 and opens valve 19 so that a piston 3 in the cylinder 16 is displaced by the pressurized water from pump 20 via line 32 to overcome a return spring (not shown). The piston 3 forces the mobile extraction head 15 against the stationary extraction head 14 with a pod in between. Position sensor 18 signals module B to close valve 19 when extraction head 15 has reached a predetermined position.

Next, module B closes valve 8 and activates pump 21 which, through line 33, delivers, through flowmeter 9 a small water volume defined by a controlled opening of electro-valve 13 for approximately 0.5 seconds in order to wet all the coffee mass in the pod prior to brewing. Such pre-wetting improves the flavor of the final brew. Valve 13 remains closed for about four seconds time and then is opened again by module B in order to admit into the extraction chamber a quantity of hot water of about 60 cu.cm. The admitted volume is measured by flowmeter 9. In response to the flow signal from flowmeter 9, module B operates valve 13 to close again once the 60 cu.cm of water have passed. Inlet water from line 33 forces heated water in boiler 10 out through valve 13 and into extraction heads 14, 15. Coffee brewed in there travels through line 17 to a cup 35. After a predetermined time, module B opens valve 19 in order to discharge water from cylinder 16 to a drain (not shown).

At the same time, module B deactivates both pumps 20, 21. Mobile extraction head 15 moves to its retracted position under the action of a return spring (not shown). Module B reactivates motor 5 in order to remove used pod from stationary extraction head 14 and reposition tape 6 to provide a fresh pod in a correct position. Thereupon, module B re-lights green LED in the display 4 in order to show that the machine is again ready to supply a further coffee from the corresponding extraction unit.

It will be realized that, without departing from the area of the invention, the illustrated machine 1 may be equipped with only reciprocating pump 21. In addition, the machine 1 can be programmed to supply a standard coffee, for instance of 40 cu.cm volume, from the first extraction unit C, and a long coffee, for instance of 60 cu.cm volume, from second extraction unit C'. The latter is possible by other obvious variations of electric and hydraulic circuits or by programming the microprocessor in module B so that the flowmeter 9 causes to pass through 40 cu.cm of water when the first extraction unit C is operated and 60 cu.cm of water when the second extraction unit C' is operated.

Figure 2:
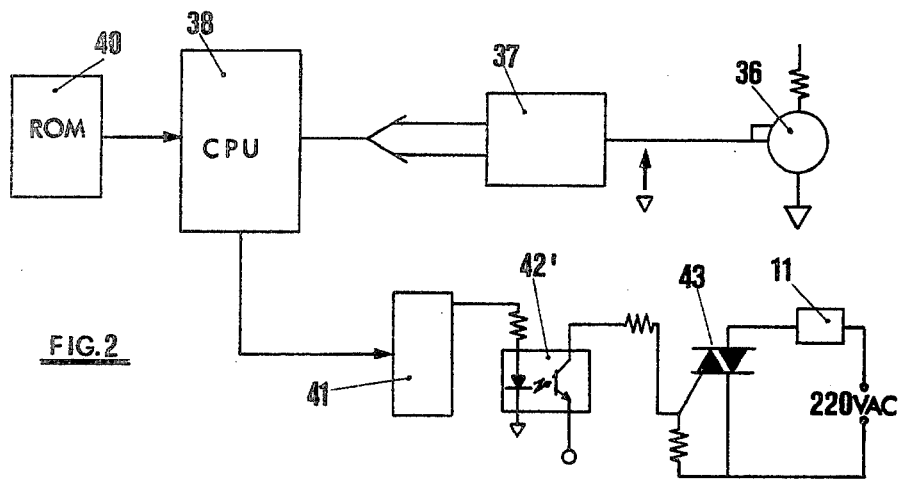
FIG. 2 is a schematic diagram of the combination thermal sensor-electric resistance for the water heating.

FIG. 2 shows a temperature sensor 36, LX 5600 (NS) which sends electrical signals to the digital-analog convertor 37, MM 5357 (NS), which converts the electrical signals into pulses that, in turn, the microprocessor 38, SC/MP (NS) handles in order to calculate the length of time for which the heating resistance 11 must be energized, according to the program introduced into the memory 40, MM 5204 (NS).

Between the microprocessor 38 and the heating resistance 11 there is interposed addressable latches 41, DM 8334 (NS) optic separator 42' low-high tension, MCA 230, Monsanto, and an interrupter 43, TRIAC-RCA, 2800 M. Each latch 41 pilots an actuator, such as electrical resistance 11. So, under a command as received from the microprocessor 38 latch 41 will maintain the resistance energized until the water temperature in the boiler reaches the predetermined value. The triac 43 is a solid state device that can handle the large alternating voltage and current required to energize resistor 11. Light emitting diodes connect latch 41 with optical separator 42' and triac 43. The gate of triac 43 is controlled by optical separator 42'. The latter provides a relatively high reverse impedance. As such, separator 42 protects the microprocessor 38 and other low voltage elements against voltage or current surges that might occur if triac 43 failed. Other latches 41 are likewise protected.

Figure 3:
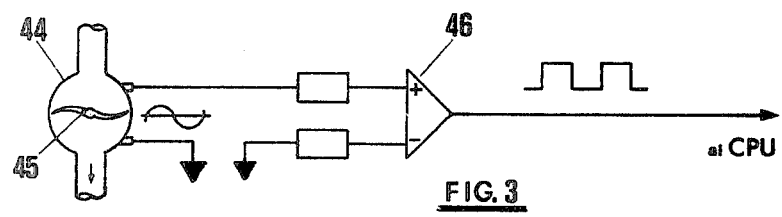
FIG. 3 is a schematic diagram of the control system for the water volume delivered to the extraction units.

FIG. 3 shows a particular flowmeter 44, from the firm KDM Electronic of Bussardweg 9 —Nurnberg. The rotor 45 sends electrical signals to an operational amplifier 46, proportionally with the passing through water flow. The operational amplifier 46, in turn, transmits the amplified signals to the microprocessor 38 that counts the signals according to the program contained in its read-only memory 40. Once the predetermined volume is reached, module B will cause the closing of the electro-valve 13 (FIG. 1) thereby terminating the infusion in an extraction head.

Figure 4:
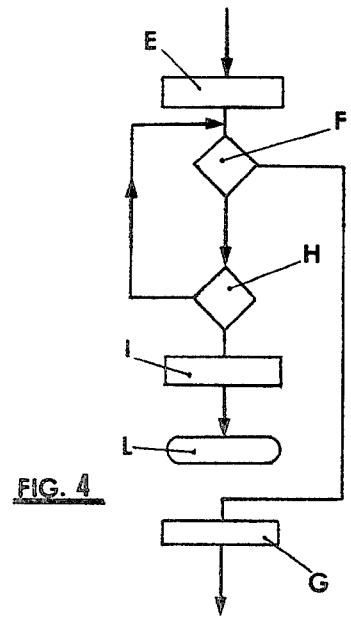
FIG. 4 is a flow chart of the self-diagnosis system for detecting the presence or absence of pods.

FIG. 4 is a flow diagram of a sub-routine for the operative checking process and of self-diagnosis for positioning of tape 6 (the means or parts referred to by numbers are shown in FIG. 1). At stage E the motor 5 is started in order to conveniently position a fresh pod into a stationary extraction head 14 (position F). When the sensor 7 confirms that a pod is set, the motor 5 stops (stage G). But if the sensor 7 does not confirm within a maximum predetermined time (5 seconds) that a pod is set, from position H a signal is delivered via module B which causes motor 5 to stop (position I). In that case a failure signal in the form of a coded number is generated in the control module 4 (stage L) to indicate a failure or an absence in the pod feeding.

It will be realized that the features of the machine 1 are such that the operative checking and self-diagnosis process as illustrated are also applied to operative checking and the self-diagnosis for the other functions of the machine.

FIG. 5 shows a more detailed schematic of modules A and B of FIG. 1. A microprocessor 38 is housed in a 40 pins, dual-in-line package. It handles 8-bit words, may receive 46 instructions, uses fixed point binary arithmetic, two's complement negative value, binary and binary coded decimal addition. It has one 8-bit accumulator, one 8-bit status register, one 8-bit auxiliary register, four 16-bit pointer registers, 5 memory and peripheral addressing modes, a 16-bit address bus, twelve of which are static and four are multiplexed on a bidirectional 8-bit, TRI-STATE data bus. The inner structure of the microprocessor, the data flow coming therefrom and the way of the outer connections are shown in FIG. 6.

The microprocessor 8 requires one single input of +5 Volts, with ±10% tolerance, applied to pins $V_{ss}$ and $V_{gg}$. The clock is generated inside by connecting a quartz crystal or simply a capacitor with pins $X_1$ and $X_2$. The oscillator circuit and the impulse generator for the clock are comprised in the integrated circuit of microprocessor 8.

Further characteristics of FIG. 5 include: Six EPROM memories referred to by 40' to $40^{VI}$, 5204 type, into which the operational program is loaded. Two RAM memories referred to as a whole by 52, 2112 type, receive the data required for carrying out the operational program as loaded. Latches 41 are integrated circuits each containing 8 nos. flip-flop for controlling power circuits, 8334 type, for actuators, such as resistance 11 or the valves. A power interface 42 comprises an optic separator MCA 230 and a TRIAC, type 2800 M, respectively referred to by 42', 43 and connected in a conventional way. The TRIAC controls an operation, for instance, the electric resistance 11 or the pump 21 of FIG. 1, in the module B. There are as many power interfaces as there are operations to be controlled.

Front panel module A comprises integrated circuits shift-register 55, a couple of seven segments displays 4', 4'' and related LED's and two sets of push-buttons each comprising three buttons for the user's selection.

A null detector 56 senses when the 220 VAC or other ac power source is at zero volts. The operation of any powered component, e.g. electrical resistance heater 11, pumps 20, 21 is delayed until the ac voltage is zero. Thus, unwanted noise is prevented. Hexadecimal clip switches 57 are operable to set the desired temperature of boiler 10. Switches 57 are connected between resistances 11 and tri-state buffers 58 to the data bus of microprocessor 38.

An eight line analog input receiver 59, type HI 508, receives analog signals, such as temperature signals, from the analog sensors, such as temperature sensor 12. Those analog signals are converted to digital signals by analog-to-digital converter 60, type MM 5337. The output of 60 is available to the CPU 38 via a data bus.

A 16-bit multiplexer 61, type DM 8219, allows the CPU 38 to check the status (on/off) of various switches in module C and to communicate such status to CPU 38 via the data bus.

INITIALIZATION

In operation, the program first executes an initialization routine as shown in FIG. 7. The machine program receives a START instruction and performs a GENERAL RESET of all variables, e.g. water temperature, time of brewing, etc. Some variables will be determined by operator selection and others by pre-programmed memory inputs. In a PRELIMINARY CHECK the program serially receives four inputs H1, H4, H5 and Ha. These inputs include data from sensors and from an operator, e.g. whether there are coffee pods, a request for coffee, the position of the module extraction heads and the operation of the zero-cross detector 56 upon receipt of such data, the program advances to a PRELIMINARY BOILER HEATING routine. During this routine, the program reads each boiler temperature, TL compares it to a predetermined desired temperature, TA (e.g. 102° C.) and turns the heating resistance 11 on and off in accordance with the comparison. The resistance is switched on for no more than a predetermined safe time, T2 (e.g. three minutes). The heating routine sets a timer T2. The heating resistance 11 remains on until the TL equals or exceeds TA or the timer T2 counts a predetermined time, e.g. three minutes. Thereupon the resistance 11 is switched off. Next, the individual temperature TR(J) of each boiler is set as desired. A counter series recycles the initialization subroutine for each boiler until all (J=N) are set at the desired, separate temperatures. Thereupon, a green LED on display A is energized indicating the machine is ready to brew coffee.

IDLE

After initialization or between brewing cycles, the machine is idle. In the idle mode, the program performs a plurality of functions, including the maintenance of the boiler temperature at their respective predetermined valves. During this mode, the program may receive data input calling for brewing. In the interim, the program checks the boiler temperature TL after an elapsed time. If TL is equal to or greater than the desired temperature of the first boiler, the program increments the boiler count and checks the next boiler, until all are checked and verified to be at or above the desired temperature.

If any one boiler temperature is below the desired temperature, TR(J), then the respective heating resistance 11 is turned on for a predetermined time. If no coffee is required, within a short interval (e.g. 30 seconds) the temperature is read again. The temperature reading after such interval is compared to the reading before the interval and the difference in temperature is recorded. An arbitrary constant, M, is generated that is proportional to the number of seconds as required to raise the temperature one degree Centigrade. The program cycles until the individual boiler temperature is reached by turning on the resistance 11 in accordance with the proportionality constant, M. If TL is equal to TR(J), then M is increased by a constant (ΔM) and the program cycles to the next boiler. If TL is greater than TR(J), then M is reduced by ΔM for the next boiler. Hence, the idle heating of each boiler is periodically and sequentially checked and maintained at a desired temperature.

Figure 9:
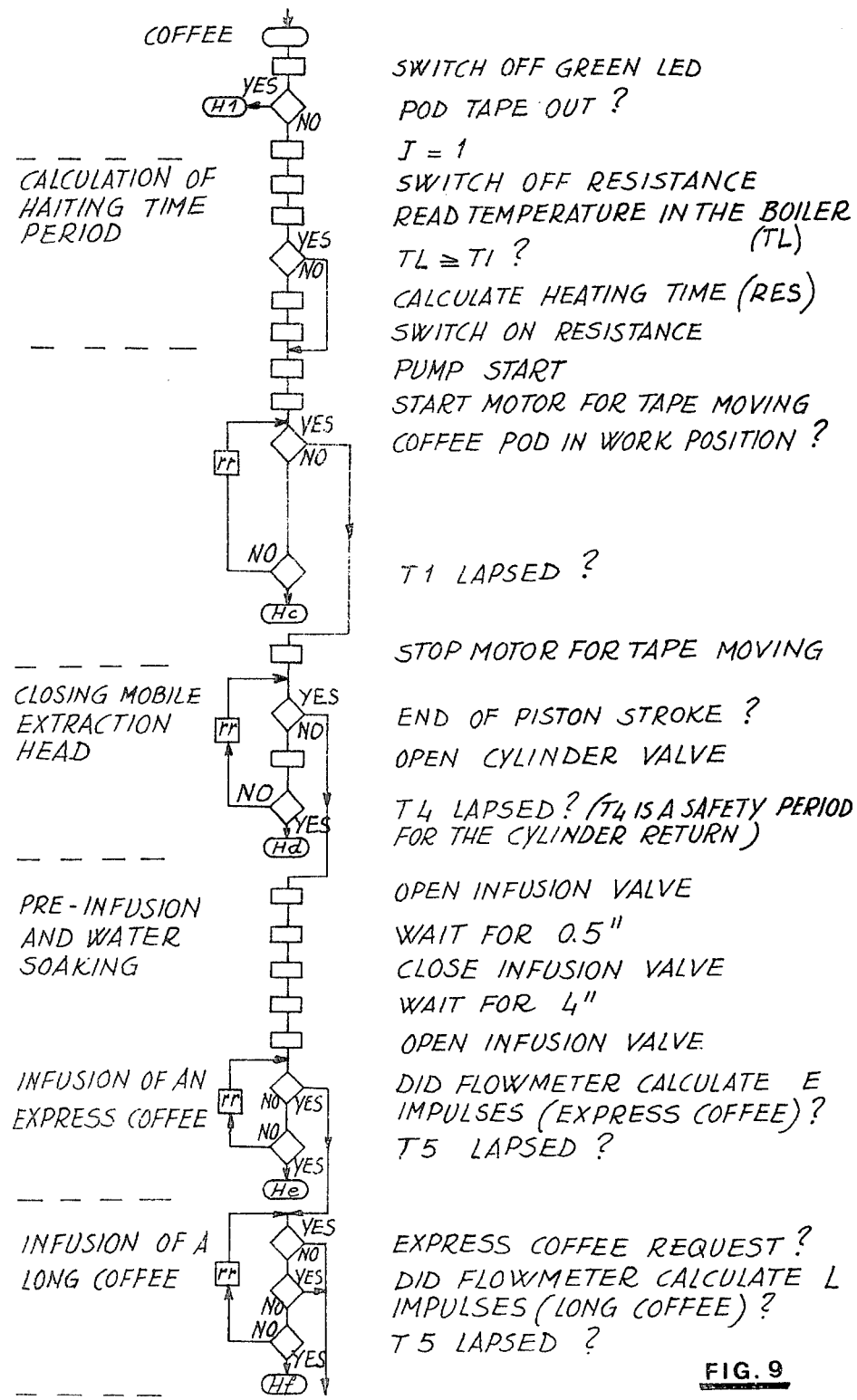
FIGS. 9 and 10 are a flow diagram of the operating program and two subroutines.
Figure 10:
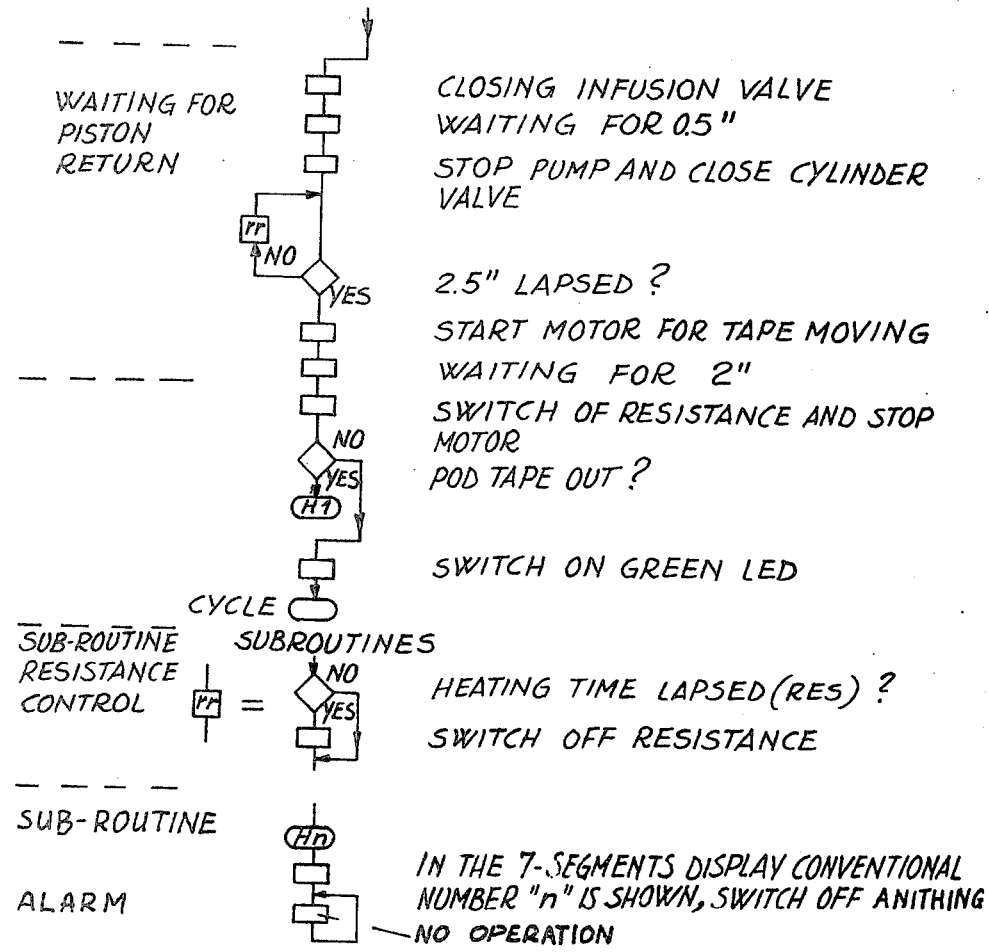

A flow chart for the coffee brewing routine is given in FIGS. 9, 10. The flow chart substantially follows the description of the operation of the machine given above.

Those skilled in the art will recognize that the rectangular boxes are preprogrammed instructions which the machine will execute in sequential order as indicated. The diamond boxes indicate decisions that the program makes based upon its memory and various inputs. Inputs to the program are indicated by the oval boxes.

I claim:

1. An automatic coffee brewing machine for brewing espresso coffee from a coffee pod disposed in a pressure operated extraction head comprising, a hydraulic pressure operated extraction unit comprising a pair of extraction heads including means for moving the heads of each pair to and from each other, means associated with said extraction unit for positioning a pod of coffee between a pair of separated extraction heads, means for delivering heated water to the pod, positioned in the extraction unit, selective signal means for generating a signal representative of the desired volume of water to be delivered to the extraction head, flow signal generating means for generating a signal representative of the volume of water delivered to said extraction unit, memory and control means, including a microprocessor, for storing data corresponding to a plurality of possible volumes of water to be delivered to each unit, means for receiving selective signals and flow signals, for comparing said received signals to the data stored in said memory, and for operating said delivery means in accordance with said received signals and memory to deliver the selected volume of heated water to the pod.

2. The machine of claim 1 wherein said flow signal generating means comprises a flowmeter for measuring the water flowing from the delivery means to the extraction unit.

3. The machine of claim 2 wherein said flowmeter comprises means for generating a digital electrical signal comprising a plurality of pulses whose total is proportional to the volume of water delivered to the extraction unit.

4. The machine of claim 3 wherein the memory of said microprocessor includes data corresponding to a plurality of total predetermined flowmeter digital pulses, means for selecting one of said plurality of total predetermined pulses in accordance with said selection means, said microprocessor including means for comparing the input flowmeter pulses to said selected data, and means for terminating the delivery of water to the extraction unit when the number of received flowmeter pulses corresponds to the selected stored data.

5. The machine of claim 1 further comprising a boiler for heating water, means for electrically controlling the energy supplied to the boiler for heating water in the boiler, means for sensing the temperature of the water in the boiler and generating an electrical signal representative of the sensed temperature and said microprocessor further comprising memory means including data corresponding to a predetermined temperature control means adapted to receive the temperature signals, compare the received signals to the stored temperature data, and to control the electrical energy supplied to the boiler in accordance with said comparison.

6. The machine of claim 5 wherein a resistance electrical heating element supplies energy to the boiler.

7. The machine of claim 1 wherein the microprocessor has means for receiving data about a plurality of serial steps in a process of brewing coffee and includes means for disabling the machine from proceeding from one step to the next step in the series until the prior step has been completed.

8. The machine of claim 7 further comprising display means operatively coupled to the microprocessor for displaying an indication of the status of each step.

9. The machine of claim 8 wherein the display means indicates a code representative of the incompleted step whereby a user may understand the source of malfunction of the machine.

10. The machine of claim 1 wherein the microprocessor is operatively coupled to one or more means in said machine through an electrical circuit including an optical separator and a triac device for protecting the microprocessor.

11. The machine of claim 1 further comprising a plurality of extraction units and said microprocessor including separately stored data for each unit corresponding to possible volumes of water to be delivered to each unit.

* * * * *